United States Patent
Weldon et al.

(10) Patent No.: US 10,244,115 B2
(45) Date of Patent: Mar. 26, 2019

(54) SYSTEMS AND METHODS FOR ACCESSING CONFERENCE CALLS

(71) Applicant: Vonage Business Inc., Atlanta, GA (US)

(72) Inventors: Kim Andrew Weldon, Atlanta, GA (US); Aaron Charlesworth, Alpharetta, GA (US); Keith Meyers, Powder Springs, GA (US)

( * ) Notice: Subject to any disclaimer, the term of this patent is extended or adjusted under 35 U.S.C. 154(b) by 0 days.

(21) Appl. No.: 15/618,858

(22) Filed: Jun. 9, 2017

(65) Prior Publication Data

US 2017/0279965 A1 Sep. 28, 2017

Related U.S. Application Data

(63) Continuation-in-part of application No. 14/333,666, filed on Jul. 17, 2014.

(51) Int. Cl.
| | |
|---|---|
| *H04M 3/51* | (2006.01) |
| *H04W 4/16* | (2009.01) |
| *H04M 3/436* | (2006.01) |
| *H04M 3/42* | (2006.01) |

(52) U.S. Cl.
CPC ..... *H04M 3/5191* (2013.01); *H04M 3/42068* (2013.01); *H04M 3/4365* (2013.01); *H04W 4/16* (2013.01)

(58) Field of Classification Search
CPC .... H04M 3/56; H04M 3/42034; H04M 3/436; H04M 1/575; H04M 3/42042
USPC ............ 379/265.09, 142.01, 142.04, 207.15, 379/202.01, 201.01, 201.07, 266.1, 379/265.05, 142.06

See application file for complete search history.

(56) References Cited

U.S. PATENT DOCUMENTS

| | | | |
|---|---|---|---|
| 6,324,263 B1 | 11/2001 | Sherwood et al. | |
| 6,856,616 B1 | 2/2005 | Schuster et al. | |
| 6,891,940 B1 | 5/2005 | Bhandari et al. | |
| 7,136,631 B1 | 11/2006 | Jiang et al. | |
| 8,064,888 B2 * | 11/2011 | Lee | H04M 3/4285 370/352 |
| 8,683,044 B2 | 3/2014 | Citron et al. | |

(Continued)

FOREIGN PATENT DOCUMENTS

| | | |
|---|---|---|
| NO | 2001/54440 | 7/2001 |
| NO | 2014/184733 | 11/2014 |

OTHER PUBLICATIONS

Oct. 26, 2015 International Search Report and Written Opinion issued in International Application No. PCT/US2015/040748 (11 pages).

(Continued)

*Primary Examiner* — Thjuan K Addy
(74) *Attorney, Agent, or Firm* — FisherBroyles, LLP; Joseph Pagnotta

(57) ABSTRACT

Systems and methods for assisting a user in conducting a telephony communication include automatically obtaining contextual information relating to the telephony communication, and presenting that information to the user. The contextual information could be drawn from a third party database. The third party database could be queried for the contextual information based on an identity to the party with who the user is attempting to communicate.

23 Claims, 9 Drawing Sheets

(56) References Cited

U.S. PATENT DOCUMENTS

| | | | |
|---|---|---|---|
| 9,036,806 B1* | 5/2015 | Bourdaillet | H04M 3/42034 379/243 |
| 9,398,147 B2 | 7/2016 | Wuthnow | |
| 9,628,467 B2 | 4/2017 | Fan et al. | |
| 2002/0054601 A1 | 5/2002 | Barraclough et al. | |
| 2003/0105804 A1 | 6/2003 | Turner et al. | |
| 2003/0177248 A1 | 9/2003 | Brown et al. | |
| 2006/0265481 A1 | 11/2006 | Seitz et al. | |
| 2007/0121914 A1 | 5/2007 | Pearson et al. | |
| 2007/0165821 A1 | 7/2007 | Altberg et al. | |
| 2007/0265990 A1* | 11/2007 | Sidhu | G06Q 10/10 705/418 |
| 2008/0144804 A1* | 6/2008 | Mergen | H04M 3/5166 379/266.1 |
| 2009/0310765 A1 | 12/2009 | Denny et al. | |
| 2011/0164741 A1* | 7/2011 | Gisby | H04M 3/38 379/202.01 |
| 2012/0296975 A1* | 11/2012 | Ghorbel | H04M 3/42365 709/204 |
| 2013/0246904 A1 | 9/2013 | Seliger et al. | |
| 2013/0279495 A1 | 10/2013 | Ma et al. | |
| 2014/0123248 A1 | 5/2014 | Balakrishnan et al. | |
| 2014/0341371 A1 | 11/2014 | Rincon et al. | |
| 2015/0031351 A1* | 1/2015 | Ibasco | H04M 3/42042 455/419 |
| 2015/0135096 A1 | 5/2015 | Dhara et al. | |
| 2015/0381803 A1* | 12/2015 | Klemm | H04M 3/4285 455/412.1 |

OTHER PUBLICATIONS

"What is Skype Click to Call?" http://support.skype.com/en/faq/FA801/what-is-skype-click-to-call (Downloaded Jan. 2, 2015).
European Search Report for EP 18176370 for Vonage Business Inc. dated Sep. 21, 2018.

* cited by examiner

SYSTEMS AND METHODS FOR ACCESSING CONFERENCE CALLS

This application is a continuation-in-part of application Ser. No. 14/333,666, filed Jul. 17, 2014, the content of which is incorporated herein by reference.

BACKGROUND OF THE INVENTION

The invention is related to tools used by sales agents and customer service agents to facilitate telephony interactions with clients.

Many sales agents routinely place telephone calls to present and potential clients. Likewise, sales agents frequently receive telephone calls from present and potential clients. Sales agents often use automated calling software that enables the agents to easily place outgoing telephone calls and receive incoming telephone calls. The automated calling software can be resident on a computing device such as a desktop or laptop computer which is separate from, but connected, to a telephony device. In other instances, the computing device itself may act as the telephony device.

Sales agents also can utilize database software to store and retrieve information about individual clients. The information is often stored by a third party that specializes in providing customer database services. The software used to access the data, and to store new data, is typically separate from any software that is used to place and receive telephone calls. Thus, when a sales agent prepares to place a sales call to a customer, the sales agent typically queries a third party database to obtain information about the client prior to placing the telephone call to the client. Similarly, when a sales agent receives an incoming telephone call from a client, the sales agent can utilize the database software to call up information about the client after the call has been received to help the sales agent better interact with and service the client.

While a call is ongoing, or after the sales agent has completed the call, the agent may use the database software to store new information in the database. The new information could be relevant to what the agent learned while interacting with the customer during the call, information about the call itself, or information about a result of the call.

Customer service agents for a business perform some of the same functions in serving individuals who call the business for customer service. Information about a business' customers may be available in a database of customer information. When a customer service agent receives in incoming telephone call from a customer, the customer service agent can use database software to call up information about the customer or his account to help the agent assist the customer. In those instances where a customer service agent places an outgoing telephone call to a customer, perhaps to follow up with a customer, or when returning a call previously placed by the customer, the customer service agent may use database software to call up information about the customer before placing the outgoing telephone call to the customer. Likewise, the customer service agent may store information about a customer in a database during a customer service call, or after such a call has been completed. The information stored in the database could be about the reasons for the call, and the result that the customer service agent was able to achieve.

In the scenarios described above, it is necessary for the sales agent or the customer service agent to actively use the database software to obtain information about a customer from a database, and to store information about a customer or a call in the database. Performing a query can slow the agent down, which means the agent interacts with fewer customers during a given shift. Also, some agents are not adept at using such database software, and as a result, the agents are sometimes unable to locate customer information in the databases. What is lacking is an easy, automatic way for a sales agent or a customer service agent to be provided with information about a customer that does not require the agent to perform a query of a third party database. Likewise, what is lacking is a way for the agent to easily store information in a database during or after a call with a customer.

DETAILED DESCRIPTION OF PREFERRED EMBODIMENTS

Figure 1:
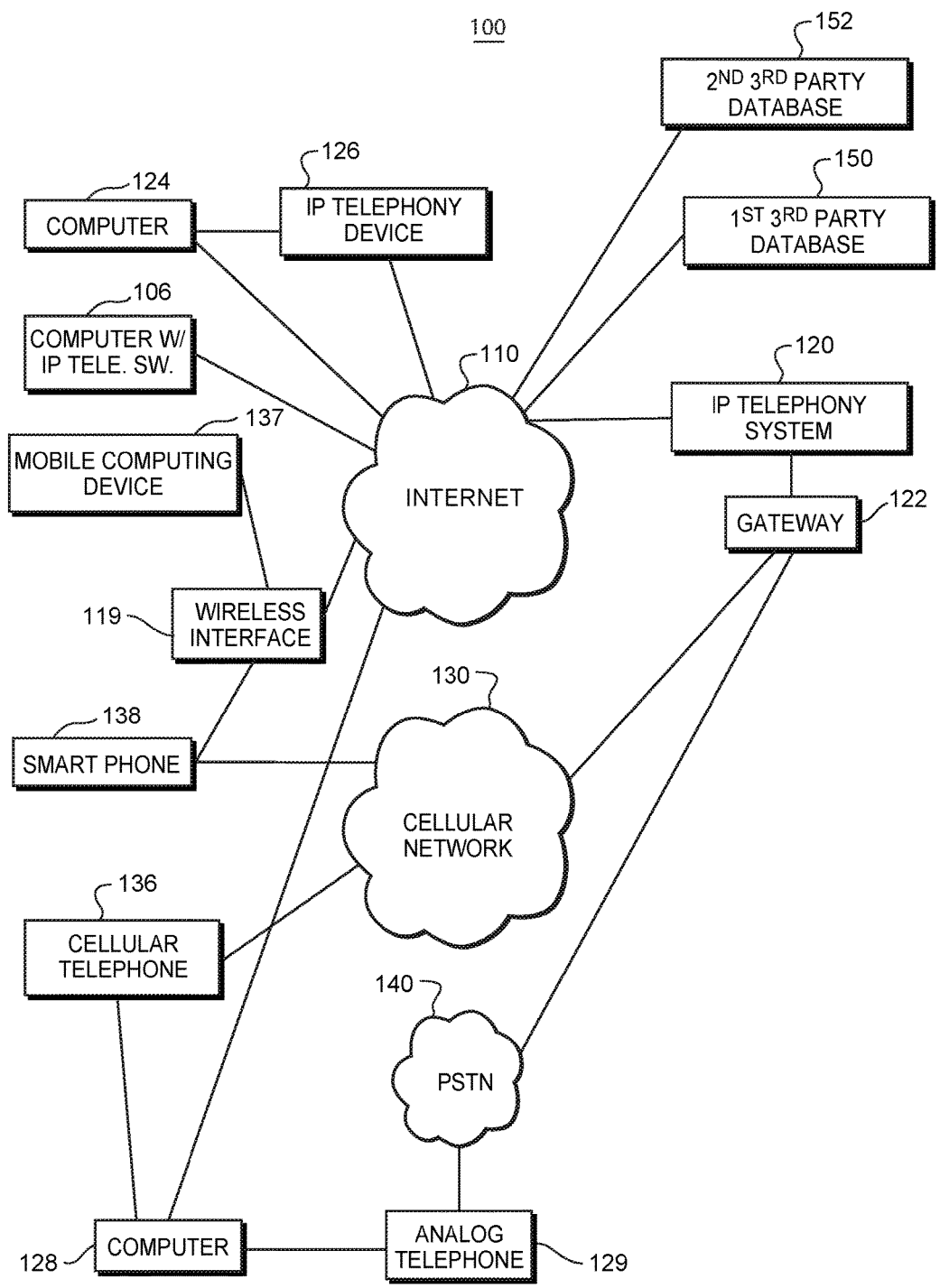
FIG. 1 is a diagram of a communications environment which could be utilized to perform methods embodying the invention.

The following detailed description of preferred embodiments refers to the accompanying drawings, which illustrate specific embodiments of the invention. Other embodiments having different structures and operations do not depart from the scope of the present invention.

The invention involves systems and methods that result in a sales agent or a customer service agent being automatically provided with information about a customer when the agent places an outgoing telephone call to the customer, or when the agent receives an incoming telephone call from a customer. Systems and methods embodying the invention also provide an easy way for sales agents and customer service agents to record information about a customer or a telephone call with a customer in a database of such information.

For purposes of the following description, the information presented to an agent and the information that is recorded by the agent will be referred to as contextual information. Contextual information could be information about the customer, or about previous interactions that the agent has had with the customer. If the customer is an employee of a business, the contextual information could also be about that business. If the agent is a sales agent, the contextual information could relate to previous sales made to the customer or the customer's business, as well as previous attempts to make sales to the customer or the customer's business.

If the agent is a customer service agent, the contextual information could relate to virtually anything with which the customer is likely to request assistance. For example, if the agent is a customer service agent for a telephony service provider, the contextual information could include information about the customer's telephony device(s), information about the service plan that a customer has with the telephony service provider, information about call history, or virtually anything else relating to the services that the telephony service provider provides to the customer. The contextual information could also include a history of past calls that the customer has placed to the telephony service provider's customer service department, a corresponding list of past problems experienced by the customer, and a list of actions that were taken in the past to address those problems experienced by the customer.

In summary, contextual information could be information of any sort or type that a sales agent or a customer service agent would find helpful in interacting with the customer to achieve their aim. Moreover, the utility of the systems and methods disclosed herein are not limited to sales agents and customer service agents. The systems and methods embodying the invention could be used in multiple other contexts to provide someone with easy access to information stored in a database, and to make it easy for that person to store information in a database. Thus, although the following descriptions relate to scenarios involving sales agents and customer service agents, the invention should in no way be limited to those sorts of scenarios.

Also, although the inventors presently believe that the claimed systems and methods are most likely to be used in conjunction with typical audio telephone calls, in alternate embodiments, other forms of customer communications may be involved. For example, rather than conducting an audio telephone call, the agent may engage in a video call with a customer. In other instances, the agent may be one of multiple parties to an analog or video conference call. Also, in some embodiments, the agent and the customer may be engaged in a text-based dialog that is implemented by instant messaging or text (SMS or MMS) messages. In still other instances, the agent and the customer may be exchanging email messages to communicate with one another. While the embodiments described herein contemplate that the agent and the customer communicate via an audio telephone call, the invention is not limited to audio telephone calls. The claimed systems and methods could be used in conjunction with virtually any form of communication that allows an agent to correspond with a customer.

The following description will also refer to telephony communications and telephony activity. These terms are intended to encompass all types of telephony communications, regardless of whether all or a portion of the communications are carried in an analog or digital format. Telephony communications could include audio or video telephone calls, facsimile transmissions, text messages, SMS messages, MMS messages, video messages, and all other types of telephony and data communications sent by or received by a user. These terms are also intended to encompass data communications that are conveyed through a PSTN or VOIP telephony system. In other words, these terms are intended to encompass any communications whatsoever, in any format, which traverse all or a portion of a communications network or telephony network.

Before describing systems and methods embodying the invention, we will first discuss a communications environment 100, as illustrated in FIG. 1, in which the systems and methods could be provided. In this communications environment 100, an IP telephony system 120 enables connection of telephone calls between its own customers and other parties via data communications that pass over a data network. The data network is commonly the Internet 110, however, private data networks may form all or a portion of the data communication path. The IP telephony system 120 is connected to the Internet 110. In addition, the IP telephony system 120 is connected to both a publicly switched telephone network (PSTN) 140 and a cellular telephony network 130 via one or more gateways 122.

The gateway 122 allows users and devices that are connected to the PSTN 140 and cellular network 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephony device, such as the IP telephony device 126, which is connected to the Internet 110. Such an IP telephony device 126 could be connected to the Internet via an Internet service provider through a wired connection or via a wireless router. The IP telephony device 126 may also access the Internet or a data network via alternate means, such as through the cellular network 130.

As illustrated in FIG. 1, a user computer 124 could be connected to the IP telephony device 126, and to the Internet 110. As will be explained below, in some embodiments of the invention a user could place and receive telephony communications over the IP telephony device 126 at the same time that contextual information relating to those telephony communications is presented to the user on the computer 124.

In addition, an individual could utilize a soft-phone client running on a desktop or laptop computer 106 to place and receive IP based telephony communications. The same or a different software application running on the computer 106 could also perform methods embodying the invention to provide that individual with contextual information, as will be described below. In some instances, the soft-phone client could be assigned its own telephone number. In other instances, the soft-phone client could be associated with a telephone number that is also assigned to separate IP telephony device 126.

Likewise, a mobile computing device 137 may be used to send and receive telephony communications via the IP telephony system 120. The mobile computing device 137 could establish a data connection to the Internet 110 via a wireless interface 119, such as a WiFi router. IP telephony software on the mobile computing device 137 could then be used to conduct telephony communications through the IP telephony system 120. At the same time, a software application on the mobile computing device 137 could present the user with contextual information.

A third party using an analog telephone 129 which is connected to the PSTN 140 may call a customer of the IP telephony system 120. In this instance, the call is initially connected from the analog telephone 129 to the PSTN 140, and then from the PSTN 140, through the gateway 122 to the IP telephony system 120. The IP telephony system 120 then routes the call to the customer's IP telephony device. Likewise, a third party using a cellular telephone 136 could also place a call to an IP telephony system customer, and the connection would be established in a similar manner, although the first link would involve communications between the cellular telephone 136 and a cellular telephony network 130.

As shown in FIG. 1, a computer 128 could be coupled to the analog telephone 129 or to the cellular telephone 136.

The computer 128 could display to a user contextual information relating to telephony communications conducted through the cellular telephone 136 and/or the analog telephone 129. The connection between the computer 128 and the cellular telephone 136 or the analog telephone 129 could be a wired connection, or a wireless connection. Also, the computer 128 could communicate with the cellular telephone 136 and/or the analog telephone 129 via the Internet 110. In this sort of a scenario, a software application running on the computer 128 would be informed when the user is placing an outgoing telephone call and/or when the user is receiving an incoming telephone call. At that point in time, the software application on the computer 128 would act to provide the user with contextual information, as described below.

In addition, a smartphone 138 that includes both mobile computing capabilities and cellular telephony capabilities can connect to the cellular network 130 using its cellular telephone capabilities. However, the smartphone 138 also may establish a data connection to the IP telephony system 120 via a wireless interface 119 and the Internet 110. In this instance, communications between the smartphone 138 and other parties could be entirely carried by data communications. Of course, alternate embodiments could utilize any other form of wired or wireless communications path to enable communications. A software application resident and running on the smartphone 138 could provide the user with contextual information.

FIG. 1 also illustrates a first third party database 150 and a second third party database 152. Contextual information can be stored on and retrieved from the third party databases 150, 152. In methods embodying the invention, contextual information is drawn from the third party databases 150, 152 and presented to a user to assist the user in accomplishing a task. The methods may also involve recording contextual information in the third party databases 150, 152 during or after a customer communication.

In the foregoing and following descriptions, references are made to an "IP telephony device." This term is used to refer to any type of device which is capable of interacting with an IP telephony system to conduct or participate in an IP telephony communication. An IP telephony device could be an IP telephone, a computer running IP telephony software, a telephone adaptor which is connected to an analog telephone, or some other type of device capable of communicating via data packets. An IP telephony device could also be a cellular telephone, a smartphone, or a portable or tablet computing device that runs a software client or "app" that enables the device to act as an IP telephony device. Such apps are available at digital distribution platforms such as the App Store by Apple Inc. of Cupertino, Calif. and the Google Play Store (formerly the Android Market) by Google Inc. of Menlo Park, Calif. Thus, a single device might be capable of operating as both a cellular telephone and an IP telephony device.

Moreover, certain devices that are not traditionally used as telephony devices may act as telephony devices once they are configured with appropriate client software. Thus, some devices that would not normally be considered telephony devices may become telephony devices or IP telephony devices once they are running appropriate software. One example would be a desktop or a laptop computer that is running software that can interact with an IP telephony system over a data network to conduct telephone calls. Another example would be a portable computing device, such as an Apple iPod Touch™ or an Apple iPad™, which includes a speaker and a microphone. A software application loaded onto an Apple iPad™ can be run so that the Apple iPad™ can interact with an IP telephony system to conduct a telephone call.

In systems and methods embodying the invention, a user who is placing an outgoing telephony communication or receiving an incoming telephony communication is automatically presented with contextual information relating to the party with whom the user is communicating. In a typical scenario, the user first requests the setup of an outgoing telephony communication with a customer. A software application embodying the invention is notified of the telephony communication setup request, and the software application determines the identity of the customer the user is attempting to reach. The software application then automatically queries a third-party database for contextual information relating to the telephony communication and/or the customer the user is attempting to reach. Assuming that query is successful, the obtained contextual information is then presented to the user as the telephony communication begins. The contextual information could be information about the called party, the called party's business, information about previous communications conducted with that called party, or virtually any other item of information that the user might find helpful.

In another similar situation, the user could receive an incoming telephony communication from a customer. In this instance, a software application embodying the invention is notified of the incoming telephony communication, and the software application determines the identity of the calling party. The software application then queries a third-party database for contextual information about the calling party of the calling party's business. Assuming the query is successful, the obtained contextual information is then presented to the user as the telephony communication begins.

In the two scenarios described above, the user is automatically presented with contextual information about the party with whom they are communicating. In systems and methods embodying the invention, the user may also be provided with an opportunity to record information about the telephony communication or the customer in the third-party database while the telephony communication is ongoing, or after the telephony communication ends.

Systems and methods embodying the invention can be implemented in various different ways. With reference to FIG. 1, in some instances a software application embodying the invention could be resident on the computer 124, which is connected to an IP telephony device 126. When the user requests the setup of an outgoing telephony communication via the IP telephony device 126, the computer software application on the computer 124 is notified of that telephony communication setup request. The software application on the computer 124 then queries a database for contextual information about the party the user is attempting to reach. If that query returns useful information, the retrieved contextual information is then presented to the user via the computer 124 and/or the IP telephony device 126.

A similar software application could be resident on a smartphone 138. When a user requests the setup of an outgoing telephony communication using the smartphone 138, the software application resident on the smartphone 138 is notified of the telephony communication setup request. The telephony communication setup request could involve the user attempting to place an outgoing telephone call using the smartphone's native cellular telephony service. Alternatively, the telephony communication setup request could involve the user attempting to place any outgoing telephone call using a separate IP telephony software application on the smartphone 138 that sets up the telephony communication via the Internet 110 with the assistance of an IP telephony system 120. In still other instances, the telephony communication setup request could be the user sending a text message or an instant message to a customer.

In any event, when the user requests the setup of an outgoing telephony communication to a customer, the software application embodying the invention on the smartphone 138 attempts to obtain contextual information regarding the party that the user is attempting to reach from a database. If contextual information is obtained, that contextual information is presented to the user via the smartphone 138. Further, the smartphone 138 could act as an interface to allow the user to input information about the customer or the telephony communication that is then stored in a database.

In the above-discussed scenario, the software application on the smartphone 138 that obtains and presents contextual information to the user, and which can facilitate the storage of contextual information in a database can be a standalone software application. Alternatively, the software application could be a part of or be integrated with IP telephony software on the smartphone 138 that is used to setup the outgoing telephony communication for the user. In still other instances, the software could be a plug-in to another software application on the smartphone 138, such as Internet browser software.

As also illustrated in FIG. 1, an analog telephone 129 that communicates through the PSTN 140, or a cellular telephone 136 that communicates through a cellular network 130, could be coupled to a computer 128. The computer 128 maintains a link to the Internet 110. A software application on the computer 128 embodying the invention could act to obtain and provide contextual information to the user when the user requests the setup of a telephony communication via the analog telephone 129 or the cellular telephone 136. Here again, the software application could be a standalone software application, or the software application could be integrated with another software application. For example, the software application could be a plug-in of an Internet browser on the computer 128.

The above-discussed scenarios involved a user requesting the setup of an outgoing telephony communication. However, when a user receives an incoming telephony communication setup request from a customer, the same basic steps could be performed by a software application embodying the invention. The software application would query a third-party database to obtain contextual information relating to the customer that is requesting the new telephony communication. Any retrieved contextual information is presented to the user. The software application embodying the invention may also allow the user to input information about the customer of the telephony communication that is then stored in a third-party database.

Regardless of the form that the software application takes, the software application may utilize an application programming interface (API) to query and access contextual information stored on a third-party database system. Likewise, the software application could utilize an API to store information provided by a user on a third-party database.

Figure 2:
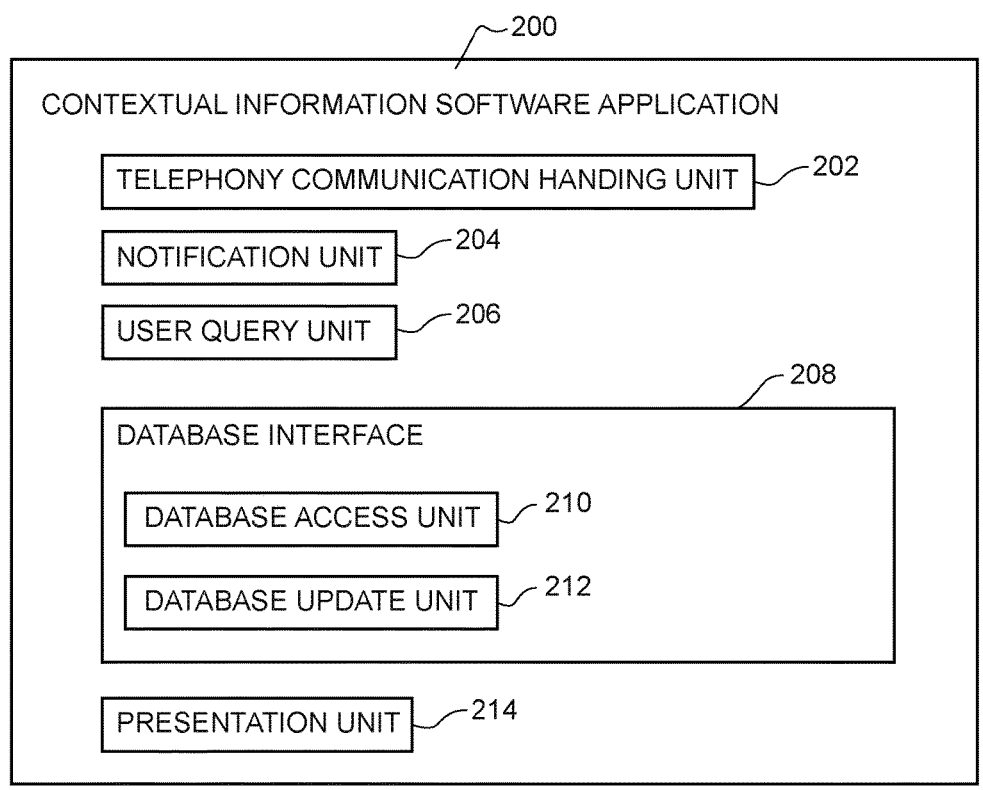
FIG. 2 is a diagram of a software application embodying the invention.

Selected components of one embodiment of a contextual information software application 200 embodying the invention is illustrated in FIG. 2. The contextual information software application 200 may include an optional telephony communication handling unit 202 which sets up outgoing and incoming telephony communications for a user. A telephony communication handling unit 202 may not be present in some contextual information applications embodying the invention. In other words, in some embodiments the ability to setup outgoing telephony communications and receive incoming telephony communications could be handled by a separate software application, or indeed by a telephony device which is completely separate from the device that hosts and runs the contextual information application 200.

In the embodiment illustrated in FIG. 2, the contextual information application 200 also includes a notification unit 204 that is notified when a user requests the setup of a new outgoing telephony communication, or when the user receives an incoming telephony communication setup request. In instances where the contextual information software application 200 includes a telephony communication handling unit 202 that is used to setup telephony communications for the user, the notification will be issued by the telephony communication handling unit 202. In instances where a separate software application is responsible for setting up incoming and outgoing telephony communications for the user, the notification unit 204 may receive such notifications from the separate software application.

In other instances, where the user will utilize a completely separate telephony device to conduct telephony communications, the user's telephony device could send a notification to the notification unit 204 when the telephony device is setting up an incoming or outgoing telephony communication. In alternate embodiments, the notification unit 204 may monitor activity on the telephony device to determine when the user is setting up an incoming or outgoing telephony communication. In yet other instances, the notification unit 204 could monitor activity on a user's telephony service provider, such as activity on a user's account with an IP telephony service provider, to determine when a user is setting up an incoming or outgoing telephony communication.

The contextual information application 200 also includes a user query unit 206 which interacts with the user to obtain various items of information from the user, as will be explained in greater detail below.

A database interface 208 of the contextual information application 200 is responsible for obtaining data from one or more third-party databases, and for obtaining contextual information from a user and recording that information in one or more third-party databases. The database interface 208 includes a database access unit 210 which is responsible for querying one or more third-party databases to obtain contextual information about a party with whom a user is communicating. A database update unit 212 allows a user to input contextual information which is then stored in one or more third-party databases.

The contextual information application 200 further includes a presentation unit 214 which is responsible for presenting information to a user. The presentation unit could act through one or more display screens, and audio speakers to communicate contextual information to a user. The presentation unit could format contextual information obtained from a third party database before presenting it to the user. This would allow contextual information obtained from multiple different third party databases, each of which stores data in different ways, to be presented to the user in a consistent fashion. The presentation unit may interact with the user to determine how contextual information is to be presented. This could include providing the user with choices about how the contextual information is presented, as well as when and under what circumstances contextual information should be obtained and presented.

Although FIG. 2 illustrates selected elements of a contextual information software application, various embodiments of the invention need not have all the elements illustrated in FIG. 2. Likewise, an embodiment could include multiple different elements or components that are not illustrated in FIG. 2.

Methods embodying the invention that would be performed by elements of a contextual information application 200 as illustrated in FIG. 2 will now be described in connection with FIGS. 3-8.

Figure 3:
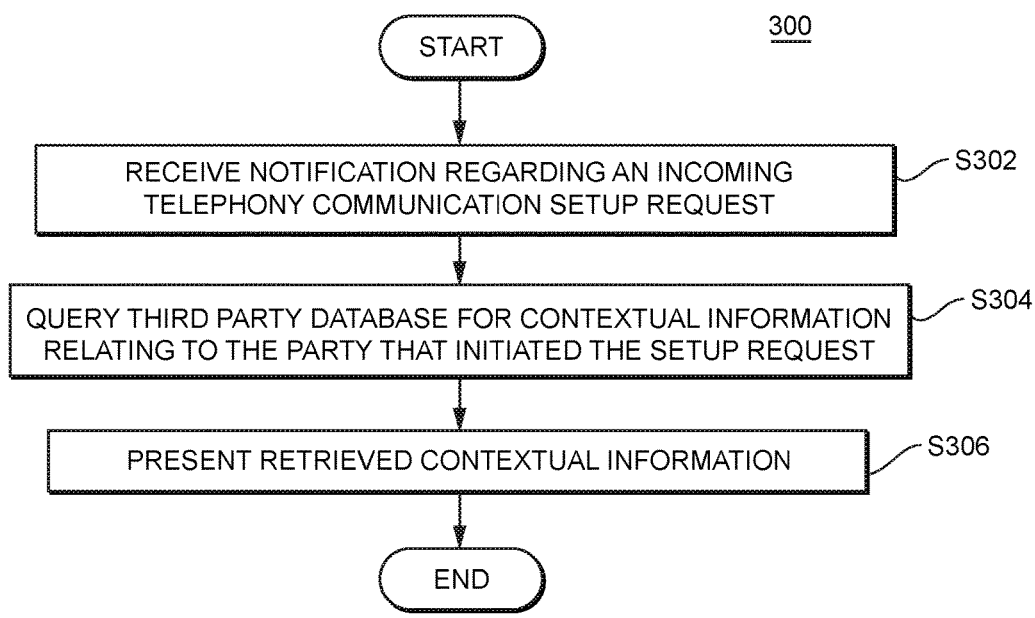
FIG. 3 is a flowchart illustrating steps of a first method embodying the invention.

In a first method as illustrated in FIG. 3, the method 300 begins and proceeds to step S302 where a notification unit 204 of the contextual information application 200 receives notification of receipt of an incoming telephony communication setup request. This could occur, for example, when a user is receiving an incoming telephone call from a calling party. In some instances, the contextual information application could include a telephony communication handling unit 202 that is responsible for setting up the incoming telephony communication. In that instance, other elements of the same software application are responsible for setting up the incoming telephony communication. As a result, it is easy for the software application to know that an incoming telephony communication setup request has been received. In other instances, the incoming telephony communication could be directed to a separate telephony device. In those instances, the telephony device could provide a notification to the notification unit 204 of the contextual information application 200 to indicate that an incoming telephony communication setup request has been received. In still other instances, the notification unit 204 may monitor a separate user telephony device to determine when an incoming telephony communication setup request has been received. The notification unit 204 might also monitor activity on the user's telephony service provider to determine when an incoming telephony communication setup request directed to the user has been received. Thus, there are multiple different ways that a notification of the receipt of an incoming telephony communication setup request could be received.

In step S304, a database access unit 210 of the database interface 208 queries a third-party database for contextual information. The third-party database could be the first third-party database 150 illustrated in FIG. 1, or the second third-party database 152 also illustrated in FIG. 1. In some embodiments, the database access unit 210 could query multiple third-party databases in an attempt to obtain contextual information.

The database access unit 210 could utilize information contained within a notification received by the notification unit 204 in step S302 to help execute a query to obtain contextual information. For example, the database access unit 210 could first attempt to identify the party that initiated the incoming telephony communication. This could be done using an identifier that is present in the telephony communication setup request, and which is sent to the notification unit 204 as part of the notification about the incoming telephony communication setup request.

For example, the incoming telephony communication setup request could contain caller ID information that identifies the telephone number and possibly the name of a calling party. The name could be an individual's name, or the name of a business. The caller ID information contained in a telephony communication setup request could be included in a notification that is sent to the notification unit 204 when the telephony communication setup request is received. If the caller ID information only includes an identifier, such as a telephone number, the database access unit may consult a third party directory database to locate an individual or business name that is associated with the identifier. That name or business name could then be used to help execute a query of a database to obtain contextual information.

In addition, when caller ID information provided to the notification unit 204 includes an identifier such as a telephone number, the database access unit 210 may be able to consult a contact list that is maintained by or for the user to obtain additional information about the calling party. For example, if the software application performing the method illustrated in FIG. 3 is resident on a smartphone, the smartphone also likely includes a contact list maintained by the user. If the database access unit 210 knows the telephone number of the calling party, which would be part of the caller ID information, that telephone number could then be used to search for additional information about the calling party in the user's contact list. That additional information could then be used to perform a query of a third-party database for contextual information relevant to the calling party.

For example, if a notification received by the notification unit 204 includes a telephone number of the calling party, the telephone number could be the main number of a business. That business could employ multiple different individuals. However, a contact list on a user's smartphone could tie that telephone number to a specific individual at the business. In other words, a search of the user's contact list for entries that include the main telephone number of the business could turn up the name of an individual at the business with whom the user regularly communicates. The database access unit 210 could then utilize the specific name obtained from the user's contact list to query a third-party database for contextual information that is specific to that individual.

In embodiments where a telephony communication handling unit 202 of the contextual information software application 200 is also handling the setup of an incoming telephony communication, it is relatively easy to obtain the caller ID information present in the incoming telephony communication setup request. However, when the contextual information application 200 is resident on a computing device that is separate from the user's telephony device that receives the incoming communication setup request, there must be some mechanism for conveying this information to the notification unit 204 of the contextual information software application 200.

In some embodiments, the contextual information software application 200 could monitor the activity on a related user telephony device and access caller ID information directly from the user's telephony device when an incoming telephony communication setup request is received. In other instances, the user's telephony device may be configured to transmit this information to the notification unit 204 when an incoming telephony communication setup request is received. In still other embodiments, such caller ID information could be obtained from or provided by a separate telephony service provider that is setting up the telephony communication.

Once the database access unit 210 has obtained some information that helps to identify the calling party that sent the telephony communication setup request, the database access unit 210 queries one or more third party databases for contextual information. The method then proceeds to step S306 where any contextual information that has been retrieved from one or more third-party databases is presented to the user. The contextual information could be presented on a display screen of a computing device which is running the contextual information application 200. For example, the presentation unit 214 could open a new window on a user's display screen, and present the contextual information to the user within that window. Alternatively, or in addition, some contextual information could be played to the user in an audio fashion. For example, textual information could be converted to speech and played to the user over a speaker. Further, some contextual information could be presented as video information. The format in which information is presented to the user could be configurable by the user. In this method 300, once the contextual information has been presented, the method ends.

Figure 4:
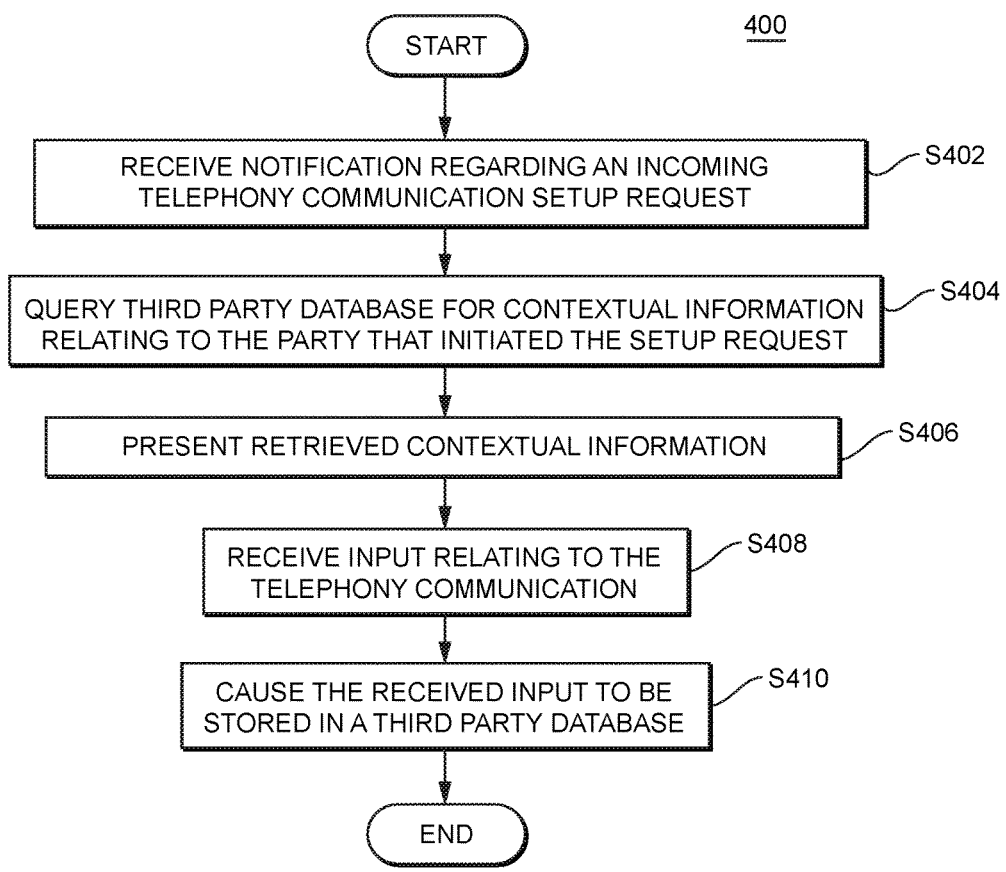
FIG. 4 is a flowchart illustrating steps of a second method embodying the invention.

A second method 400 embodying the invention is presented in FIG. 4. The method 400 begins and proceeds to step S402 where a notification unit 204 receives notification of receipt of an incoming telephony communication setup request. The method then proceeds to step S404 were the database access unit 210 obtains information about the party that sent the telephony communication setup request, and then uses that information to query one or more third-party database for contextual information. In step S406, the retrieved contextual information is presented to the user by a presentation unit 214.

The method 400 then proceeds to step S408 where a database update unit 212 of the contextual information application 200 receives input from the user relating to the telephony communication or the calling party. The received input could be notes about what transpired during the telephony communication. The input that is received from the user can be received while the telephony communication is ongoing. Alternatively, the user could provide input regarding the telephony communication after the telephony communication has been terminated.

The method then proceeds to step S410, where the database update unit 212 causes the information received from the user regarding the telephony communication or the calling party to be stored in one or more third-party databases. The method 400 then ends.

The input received from a user in step S408 of the method illustrated in FIG. 4 could be provided in a variety of different ways. In some instances, a user could utilize a keypad and a pointing mechanism of a computing device to provide the input. In other instances, a user could provide audio input that is received by a microphone, and which is then converted into text which is to be stored in the third-party database. In other instances, audio input provided by the user could simply be stored in an audio file which is then uploaded to a third-party database.

In some instances, a user could be presented with a form which the user fills out to provide information about the telephony communication. The form could include pre-defined fields where a user can store different types of information about the telephony communication or the calling party. Such a form could be user configurable so that a user could determine what types of information are to be recorded in connection with various telephony communications. By separating user input into predefined fields, it may be easier to upload the user provided input into a third-party database.

The input provided by user in step S408 could also include information other than text or audio input. For example, the user could attach various pre-existing documents which are to be uploaded and stored in a third-party database. Also, the user could create a new document that is to be uploaded and stored in a third party database.

The information which is stored in a third-party database could be time stamped to indicate when the telephony communication occurred. The time information could include the start and end times of the telephony communication. Also, the information stored in the third-party database could include information about the calling party which is drawn from the telephony communication setup request. For example, the information that is ultimately uploaded to a third-party database could include the telephone number of the calling party, as well as the name of the calling party. As mentioned above, the name of the calling party could be drawn from caller ID information associated with the telephony communication setup request, or the name information could be drawn from a contact list that is maintained by the user on his telephony device.

Figure 5:
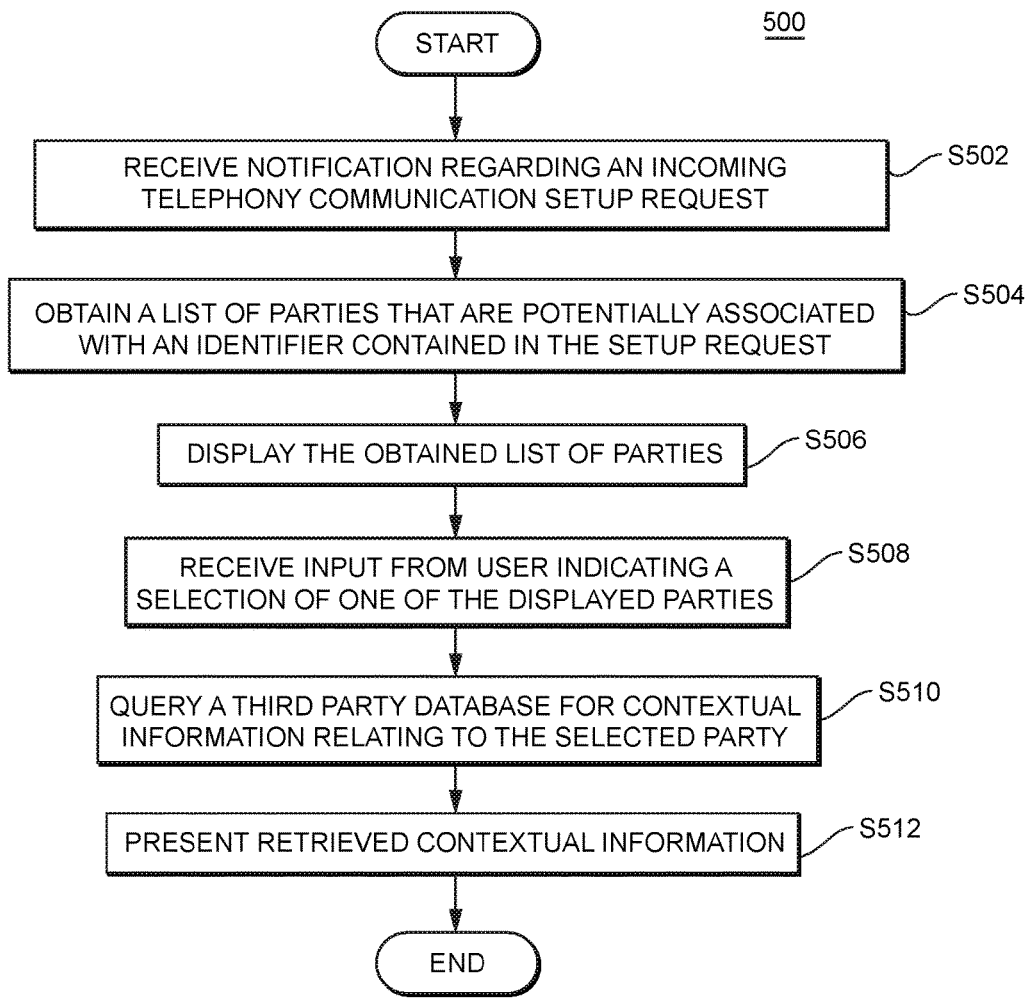
FIG. 5 is a flowchart illustrating steps of a third method embodying the invention.

Another method embodying the invention is illustrated in FIG. 5. The method 500 begins and proceeds to step S502 where a notification unit 204 receives notification of receipt of an incoming telephony communication setup request. In this method, the information in the telephony communication setup request may identify a business which includes multiple different employees. For example, the telephone number contained in caller ID information within the telephony communication setup request could be the main telephone number of that business. As a result, it would be difficult to pinpoint the identity of the calling party based on that information alone. As a result, the method 500 illustrated in FIG. 5 allows the user to provide input to help identify the likely calling party before an attempt is made to query a third-party database for contextual information relating to that party.

After step S502, the method proceeds to step S504 where a user query unit 206 obtains a list of parties that are potentially associated with the incoming telephony communication setup request. For example, an identifier contained in a telephony communication setup request, such as a telephone number, can be used to consult a database that lists the employees within the business associated with that telephone number.

Alternatively, the user query unit 206 could consult a contact list that is maintained by or for the user to help identify one or more parties that are associated with the business. For example, if the user typically interacts with three different individuals at a business, it is likely that the user's contact list will include separate entries for all three of those individuals, and each of those entries will list the main business telephone number that was contained in the caller ID information in the telephony communication setup request. By searching the user's contact list, based on the telephone number of the business, the user query unit 206 can obtain the names of those three individuals.

The method then proceeds to step S506 where the user query unit 206 displays the list of parties which potentially are associated with the telephone number of the business. In step S508 the user query unit 206 receives input from the user that indicates one of the displayed parties that the user believes is likely the one who initialed the incoming telephony communication. The user could make that selection after the telephony communication has begun, and once the user actually knows who initiated the incoming telephony communication setup request. The method then proceeds to step S510 where a database access unit 210 queries one or more third-party databases for contextual information relating to the party identified by the user in step S508. In step S512, the retrieved contextual information is then presented to the user. The method 500 then ends.

In the method illustrated in FIG. 5, the contextual information software application attempts to identify a list of individuals who may be the calling party. In some instances, it may be impossible to identify one or more individuals who are likely the calling party. Thus, in some alternate methods, the user may be presented with a query asking for the user to provide information regarding the calling party. For example, after the telephony communication begins, the user is likely to know the identity of the calling party. At that point in time, the user could input the name of the calling party. The database access unit 210 could then conduct a query of one or more third-party databases using the name provided by the user in order to obtain contextual information relating to the calling party.

In the methods described above in connection with FIGS. 3-5, a user was receiving an incoming telephony communication from a calling party. We will now discuss alternate methods where the user has requested the setup of an outgoing telephony communication directed to a called party, and where contextual information relating to the called party is obtained and presented to the user.

Figure 6:
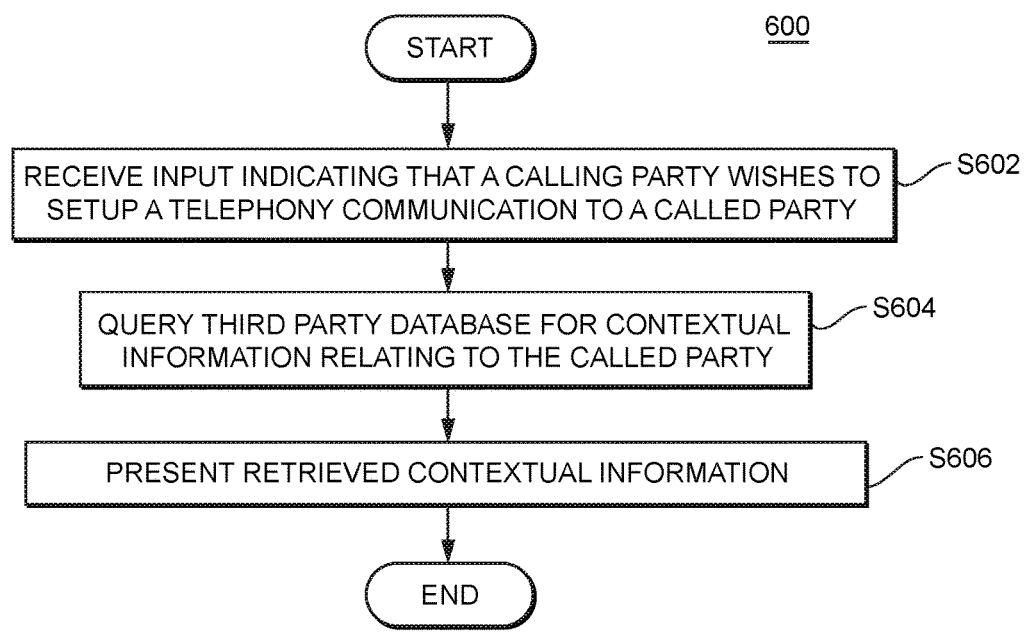
FIG. 6 is a flowchart illustrating steps of a fourth method embodying the invention.

A first method that would be performed by a contextual information software application 200 embodying the invention when a user requests the setup of an outgoing telephony communication is illustrated in FIG. 6. The method 600 begins and proceeds to step S602 where a notification unit 204 of the contextual information software application 200 receives input indicating that a user party wishes to setup a telephony communication with a called party. In embodiments where the contextual information software application 200 includes a telephony communication handling unit 202, the notification would be issued by another element of the software application itself. In other instances, such as where a user is utilizing a separate telephony device to setup the outgoing telephony communication, the input could be sent to the notification unit 204 from the user's telephony device. In other instances, the notification unit 204 could monitor activity on a user's telephony device or the user's activity at a telephony service provider to determine when the user is attempting to setup an outgoing telephony communication to a called party.

The method then proceeds to step S604 where a database access unit 210 identifies the party that the user is likely trying to reach, and where the database access unit 210 queries one more third-party databases for contextual information relating to the called party. The identity of the called party could be determined using information in the telephony communication setup request, such as the called telephone number. A name may be included in or tied to the information in the telephony communication setup request. Also, where a user selects an entry on a contact list in order to initiate the setup of the outgoing telephony communication, additional information within that contact list regarding the called party could be used to perform a query of a third-party database.

For example, if the outgoing telephony communication setup request is directed to a telephone number that is associated with a business having multiple employees, it would be difficult to know which employee the user is attempting to reach. However, if there is an entry in the user's contact list against that business telephone number, the contact list could provide a name of an individual that the user is likely attempting to reach. The name information drawn from the user's contact list could be used to help query a third-party database for contextual information about the party that the user is attempting to reach.

The method then proceeds to step S606 where a presentation unit 214 presents contextual information obtained from a third-party database in step S604 to the user, as described in detail above. The method 600 then ends.

Figure 7:
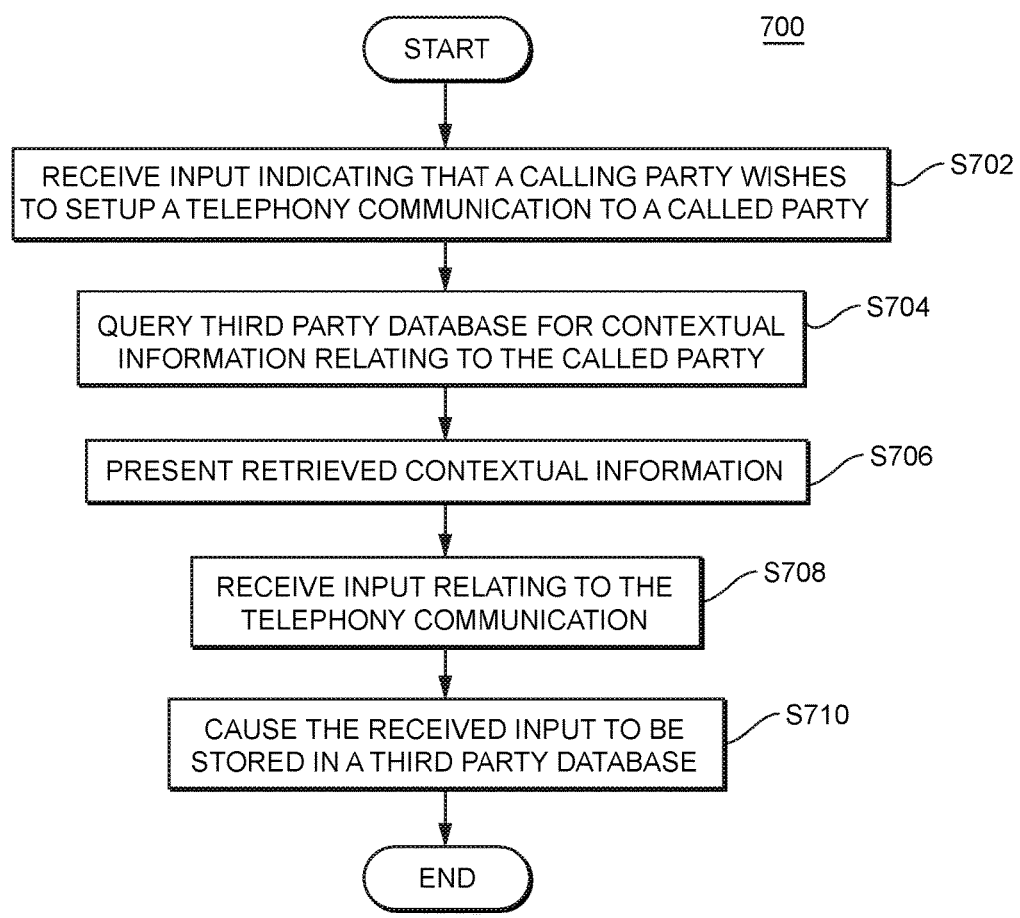
FIG. 7 is a flowchart illustrating steps of a fifth method embodying the invention.

FIG. 7 illustrates steps of another method which would be performed in connection with the setup of an outgoing telephony communication. The method 700 begins and proceeds to step S702 where a notification unit 204 receives input indicating that a user has requested the setup of a new telephony communication to a called party. The method then proceeds to step S704 where a database access unit 210 identifies the called party and queries one or more third-party databases for contextual information relating to the called party. In step S706, the retrieved contextual information is then presented to the user.

The method then proceeds to step S708 where a database update unit 212 receives input from the user relating to the telephony communication or the called party. That input could be provided to the database update unit 212 in multiple different forms and ways, as discussed above. The method then proceeds to step S710 where the database update unit 212 causes the received input to be stored in one or more third-party databases. The method 700 then ends.

Figure 8:
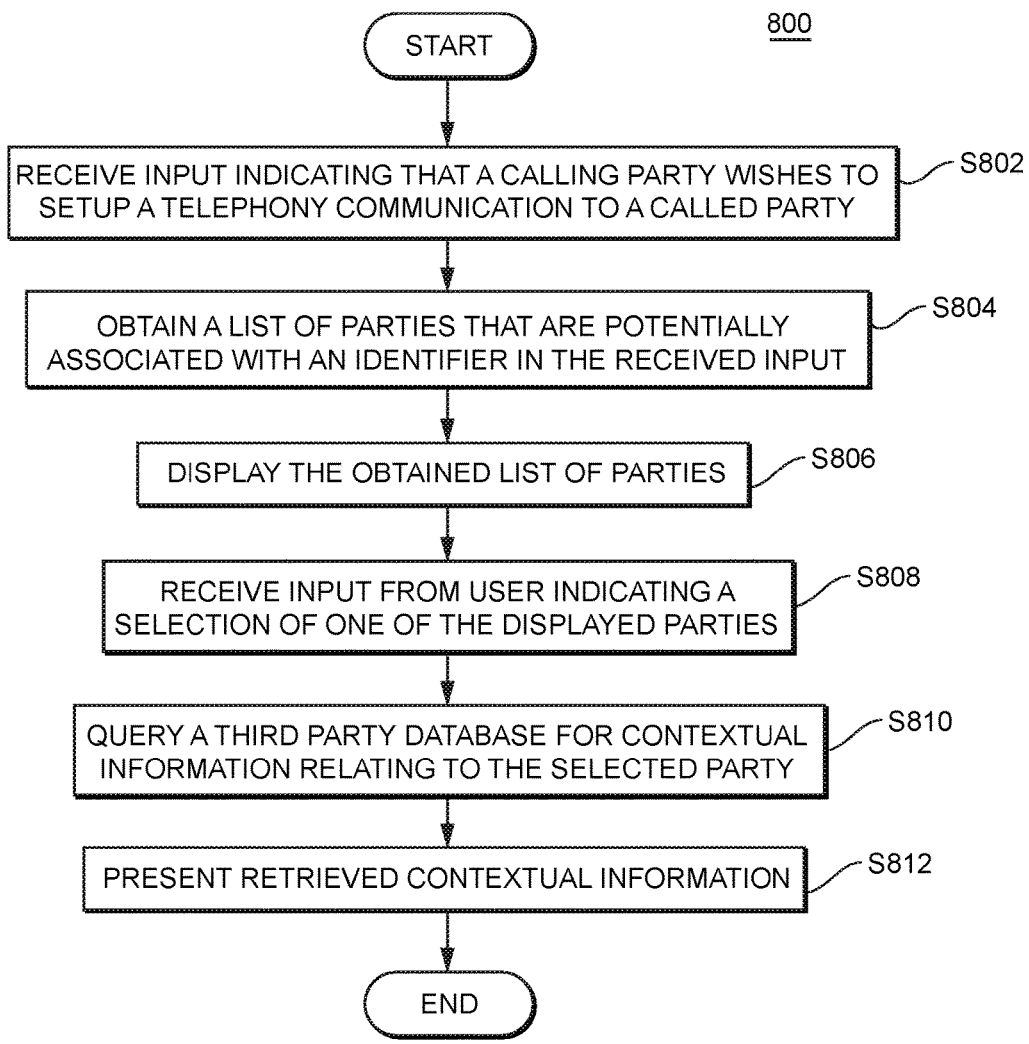
FIG. 8 is a flowchart illustrating steps of a sixth method embodying the invention.

A third method that is associated with the setup of an outgoing telephony communication is illustrated in FIG. 8. The method 800 begins and proceeds to step S802 where a notification unit 204 receives input indicating that a user wishes to setup a telephony communication to a called party. As mentioned above, the received input could include a telephone number to which the outgoing telephony communication is directed. In those instances where multiple different parties are associated with that telephone number, it is helpful to obtain input from the user to help identify the party the user is attempting to reach. As a result, the method then proceeds to step S804 where a user query unit 206 presents a list of parties to which the outgoing telephony communication may be directed. As mentioned above, this can be done by consulting a third-party database, by consulting a contact list maintained by the user, or via other methods.

In step S806, the user query unit 206 displays the obtained list of parties. In step S808, the user query unit 206 receives input from the calling party that indicates which of the displayed parties the calling party is attempting to reach. The method then proceeds to step S810 where a database access unit 210 queries one or more third-party databases for contextual information relating to the party identified in step S808. In step S812, the retrieved contextual information is then presented to the calling party. The method 800 then ends.

In the methods described above, when a user requests the setup of an outgoing telephony communication directed to a called party, an identity of the called party could be determined using an identifier, such as a telephone number, associated with the called party. Likewise, when a user receives an incoming telephony communication setup request, an identifier in that incoming telephony communication setup request, such as a telephone number, could be used to help identify the calling party. The specific examples given above related to outgoing telephone calls or incoming telephone calls. For this reason, the identifier was likely a telephone number.

In alternate embodiments, where the telephony communication that is being setup is some other form of communication, a different type of identifier could be used. For example, if the user and a calling or called party will communicate with an instant messaging exchange, the identifier used to identify the other party could be an instant messaging user name. If the communication will be via email messages, then the identifier could be an email address of the other party. Thus, the invention should in no way be limited to the use of telephone numbers to help identify that party who will communicate with the user.

The present invention may be embodied in methods, apparatus, electronic devices, and/or computer program products. Accordingly, the invention may be embodied in hardware and/or in software (including firmware, resident software, micro-code, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 9:
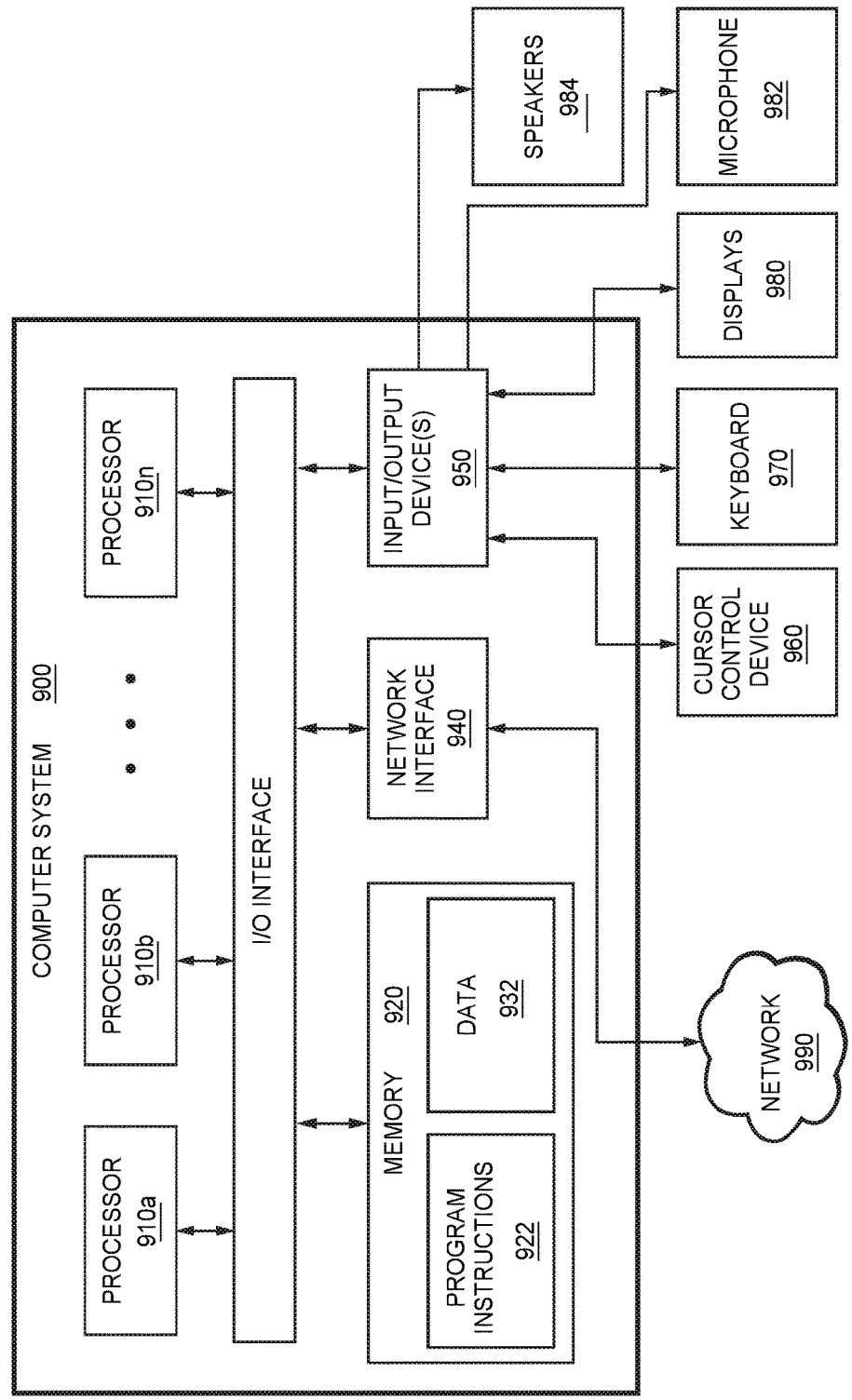
FIG. 9 is a diagram of a computer system and associated peripherals which could embody the invention, for which could be used to practice methods embodying the invention.

FIG. 9 depicts a computer system 900 that can be utilized in various embodiments of the present invention to implement the invention according to one or more embodiments. The various embodiments as described herein may be executed on one or more computer systems, which may interact with various other devices. One such computer system is the computer system 900 illustrated in FIG. 9. The computer system 900 may be configured to implement the methods described above. The computer system 900 may be used to implement any other system, device, element, functionality or method of the above-described embodiments. In the illustrated embodiments, the computer system 900 may be configured to implement the disclosed methods as processor-executable executable program instructions 922 (e.g., program instructions executable by processor(s) 910) in various embodiments.

In the illustrated embodiment, computer system 900 includes one or more processors 910a-910n coupled to a system memory 920 via an input/output (I/O) interface 930. Computer system 900 further includes a network interface 940 coupled to I/O interface 930, and one or more input/output devices 950, such as cursor control device 960, keyboard 970, display(s) 980, microphone 982 and speakers 984. In various embodiments, any of the components may be utilized by the system to receive user input described above. In various embodiments, a user interface may be generated and displayed on display 980. In some cases, it is contemplated that embodiments may be implemented using a single instance of computer system 900, while in other embodiments multiple such systems, or multiple nodes making up computer system 900, may be configured to host different portions or instances of various embodiments. For example, in one embodiment some elements may be implemented via one or more nodes of computer system 900 that are distinct from those nodes implementing other elements. In another example, multiple nodes may implement computer system 900 in a distributed manner.

In different embodiments, the computer system 900 may be any of various types of devices, including, but not limited to, a personal computer system, desktop computer, laptop, notebook, or netbook computer, a portable computing device, a mainframe computer system, handheld computer, workstation, network computer, a smartphone, a camera, a set top box, a mobile device, a consumer device, video game console, handheld video game device, application server, storage device, a peripheral device such as a switch, modem, router, or in general any type of computing or electronic device.

In various embodiments, the computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs). In multiprocessor systems, each of processors 910 may commonly, but not necessarily, implement the same ISA.

System memory 920 may be configured to store program instructions 922 and/or data 932 accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 920. In other embodiments, program instructions and/or data may be received, sent or stored upon different types of computer-accessible media or on similar media separate from system memory 920 or computer system 900.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network (e.g., network 990), such as one or more external systems or between nodes of computer system 900. In various embodiments, network 990 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

In some embodiments, the illustrated computer system may implement any of the operations and methods described above, such as the methods illustrated by the flowcharts of FIGS. 3-8. In other embodiments, different elements and data may be included.

Those skilled in the art will appreciate that the computer system 900 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM DDR, RDRAM, SRAM, and the like), ROM, and the like.

Although some of the foregoing descriptions referred to an IP telephony system, the same basic methods could also be accomplished by an alternate type of telephony system, such as a traditional analog telephony system or a cellular telephony system. Thus, the use of an IP telephony system for purposes of describing the invention should in no way be considered limiting. Systems and methods embodying the invention could also be implemented as part of an alternate type of telephony system.

In many of the foregoing descriptions, a software application running on a telephony device may perform certain functions related to the disclosed technology. In alternate embodiments, a browser running on the telephony device may access a software application that is running on some other device via a data network connection. For example, the software application could be running on a remote server that is accessible via a data network connection. The software application running elsewhere, and accessible via a browser on the telephony device may provide all of the same functionality as an application running on the telephony device itself. Thus, any references in the foregoing description and the following claims to an application running on a telephony device are intended to also encompass embodiments and implementations where a browser running on a telephony device accesses a software application running elsewhere via a data network.

Also, although many of the examples discussed above relate to telephony communications, those telephony communications could be audio or video calls, video conferences, or other forms of communications. The methods and techniques described above could be used to enable many different types of communications. Thus, the foregoing references to calls or telephony communications should in no way be considered limiting.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A computer-implemented method of providing contextual information to a called party, comprising:
   receiving, with at least one processor, notification that a call setup request directed to a called party telephony device has been received;
   querying a third party database located on a computer device other than the called party telephony device via a data network, where the query seeks to obtain contextual information relating to at least one previous communication between the called party and a calling party that initiated the call setup request; and
   presenting the contextual information obtained via the query to the called party.

2. The method of claim 1, wherein the received notification includes a calling party identifier, and wherein the query of the third party database is based on the calling party identifier.

3. The method of claim 2, wherein the calling party identifier is a telephone number.

4. The method of claim 1, wherein the querying and presenting steps are performed by a browser with an application plug-in.

5. The method of claim 4, wherein the browser with an application plug-in is resident on a telephony device that receives the call setup request.

6. The method of claim 1, wherein the query of the third party database is performed using an application programming interface for the third party database.

7. The method of claim 1, further comprising causing information obtained from the called party that relates to the incoming call to be recorded in the third party database via the data network.

8. The method of claim 7, wherein the causing step is performed using an application programming interface for the third party database.

9. The method of claim 1, wherein the received notification includes a calling party identifier, and where the method further comprises presenting to the called party a list of one or more potential calling parties that are associated with the calling party identifier.

10. The method of claim 9, further comprising receiving input from the called party that is indicative of a selection of one of the one or more potential calling parties on the presented list, and wherein the querying step comprises querying the third party database to obtain contextual information related to the selected potential calling party.

11. A non-transitory computer readable medium bearing a set of instructions that, when processed by one or more processors of a computing device, cause the computing device to perform a method comprising the steps of:
   receiving a notification that a call setup request directed to a called party telephony device has been received;
   querying a third party database located on a computer device other than the called party telephony device via a data network, where the query seeks to obtain contextual information relating to a previous communication between the called party and a calling party that initiated the call setup request; and
   presenting the contextual information obtained via the query to the called party.

12. A computer-implemented method of providing contextual information to a calling party, comprising:
   receiving, with at least one processor, input that indicates that the calling party wishes to setup a telephony communication with a called party;
   querying a third party database located on a computer device other than the calling party telephony device via a data network, where the query seeks to obtain contextual information relating to a previous communication between the calling party and the called party; and
   presenting the contextual information obtained via the query to the calling party.

13. The method of claim 12, wherein a called party identifier is associated with the called party, and wherein the query of the third party database is based on the called party identifier.

14. The method of claim 13, wherein the called party identifier is a telephone number.

15. The method of claim 12, wherein the querying and presenting steps are performed by a browser with an application plug-in.

16. The method of claim 15, wherein the browser with an application plug-in is resident on the calling party telephony device.

17. The method of claim 12, wherein the query of the third party database is performed using an application programming interface for the third party database.

18. The method of claim 12, further comprising causing information obtained from the called party that relates to the call to be recorded in the third party database via the data network.

19. The method of claim 18, wherein the causing step is performed using an application programming interface for the third party database.

20. The method of claim 12, wherein a called party identifier is associated with the called party, and where the method further comprises presenting to the calling party a list of one or more potential called parties that are associated with the called party identifier.

21. The method of claim 20, further comprising receiving input from the calling party that is indicative of a selection of one of the one or more potential called parties on the presented list, and wherein the querying step comprises querying the third party database to obtain contextual information related to the selected potential called party.

22. The method of claim 1, further comprising causing information obtained from the calling party to be recorded in the third party database via the data network.

23. The method of claim 12, further comprising causing information obtained from the called party to be recorded in the third party database.

* * * * *